United States Patent
Ellmann

(10) Patent No.: US 8,695,654 B2
(45) Date of Patent: Apr. 15, 2014

(54) TIRE OF A VEHICLE WITH A SENSOR ELEMENT

(75) Inventor: Manfred Ellmann, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 13/160,673

(22) Filed: Jun. 15, 2011

(65) Prior Publication Data

US 2011/0240195 A1 Oct. 6, 2011

Related U.S. Application Data

(63) Continuation of application No. PCT/EP2009/008577, filed on Dec. 2, 2009.

(30) Foreign Application Priority Data

Jan. 29, 2009 (DE) .......................... 10 2009 006 707

(51) Int. Cl.
*B60C 23/00* (2006.01)
*B60C 11/00* (2006.01)

(52) U.S. Cl.
USPC ...................................................... 152/152.1

(58) Field of Classification Search
USPC ...................................................... 152/152.1
See application file for complete search history.

(56) References Cited

U.S. PATENT DOCUMENTS

| 6,058,781 A | * | 5/2000 | Kusuyama et al. | ............. 73/724 |
| 7,881,066 B2 | | 2/2011 | Scheungraber et al. | |
| 2002/0174925 A1 | * | 11/2002 | Wilson et al. | ................. 152/415 |

FOREIGN PATENT DOCUMENTS

| DE | 20 2005 005 144 U1 | 7/2005 |
| DE | 10 2006 004 707 A1 | 9/2006 |
| DE | 102006004707 A1 * | 9/2006 |
| DE | 10 2006 020 632 A1 | 11/2007 |
| DE | 102006020632 A1 * | 11/2007 |
| DE | 10 2007 030 231 A1 | 1/2009 |
| EP | 1 561 608 A1 | 8/2005 |
| EP | 1 721 760 A1 | 11/2006 |
| WO | WO 2004/005054 A1 | 1/2004 |

OTHER PUBLICATIONS

Machine translation for German 102006020632 (no date).*
Machine translation for German 102006004707 (no date).*
German Search Report dated Jul. 9, 2009 including partial English-language translation (Nine (9) pages).
International Search Report dated Feb. 8, 2010 including English-language translation (Four (4) pages).

\* cited by examiner

*Primary Examiner* — Steven D Maki
(74) *Attorney, Agent, or Firm* — Crowell & Moring LLP

(57) ABSTRACT

A tire of a vehicle, in particular a motor vehicle, includes a tread for rolling on a driving surface and a plate-shaped sensor element that is mounted on the tread. The plate-shaped sensor element is mounted so as to be oriented essentially perpendicular to the adjacent tread area.

4 Claims, 5 Drawing Sheets

TIRE OF A VEHICLE WITH A SENSOR ELEMENT

CROSS-REFERENCE TO RELATED APPLICATIONS

This application is a continuation of PCT International Application No. PCT/EP2009/008577, filed Dec. 2, 2009, which claims priority under 35 U.S.C. §119 from German Patent Application No. DE 10 2009 006 707.8, filed Jan. 29, 2009, the entire disclosures of which are herein expressly incorporated by reference.

BACKGROUND AND SUMMARY OF THE INVENTION

The invention relates to a tire of a vehicle, in particular a motor vehicle, with a tread for rolling on a driving surface and with a plate-shaped sensor element, which is mounted on the tread. Furthermore, the invention relates to a tire sensor element for mounting on a tread of a tire of a vehicle.

At the present time, a broad spectrum of tire and electronics manufacturers are developing tires with sensor elements. The sensor elements are used predominantly for monitoring the tire pressure of the respective tire and, in particular, for detecting a sudden pressure loss in the tire. In such a case, the pressure loss in the tire that is caused by the puncture of the tire carcass has to be indicated forthwith to the driver, so that the driver can react accordingly and, for example, decelerate the vehicle to a lower speed.

However, when the tire carcass is punctured, there is at the same time the highly relevant probability that the sensor element, located in the tire carcass, will be damaged by the object that caused the puncture.

There is therefore needed a tire with a sensor element such that a significantly higher reliability in terms of detecting a pressure loss due to a puncture in the tire carcass can be guaranteed.

This and other needs are met according to the invention, which provides a tire of a vehicle, in particular a motor vehicle, with a tread for rolling on a driving surface and with a plate-shaped sensor element, which is mounted on the tread. In this case, the sensor element is mounted so as to be oriented essentially perpendicular to the adjacent tread area. The perpendicular arrangement results in a significantly smaller area of the sensor element being exposed, when viewed from the direction of the tread, to any potential external influence due to a puncture.

In a first advantageous further development of this solution according to the invention, the sensor element is mounted in a resiliently swivellable manner on the tread. The resilient swivelling enables an intentional deflection on the part of the sensor element in the case of an external influence due to an object penetrating the tire.

In a second solution according to the invention and simultaneously advantageous further development, the side of the sensor element that faces the adjacent tread area is designed with a puncture-inhibiting protective layer. The protective layer, in particular in the form of a metal plate, protects the sensor element and deflects any object that may penetrate there such that the object cannot damage the sensor element.

In a third solution according to the invention and simultaneously advantageous further development, the sensor element is mounted on the adjacent tread area so as to be foldable due to an external influence. The foldably mounted sensor element can dodge the influence of an external body by way of a suitable folding movement.

In a fourth advantageous further development, the side of the sensor element that faces the adjacent tread area is designed with an outer face, which slopes in the direction of this tread area. The sloping outer face leads to a sliding off of any external body that may have penetrated there.

Furthermore, the invention provides a tire sensor element that is intended to be mounted on a tread of a tire of a vehicle, is configured in the shape of a plate, and has a puncture-inhibiting protective layer on one of its side faces.

In a first alternative and simultaneously advantageous further development of this solution according to the invention, the side of the tire sensor element that faces the adjacent tread area is designed with an outer face, which slopes in the direction of this tread area.

The invention is based on the recognition that in the case of a plate-shaped or a flat sensor element that is oriented parallel to the adjacent tread there is a relatively high probability that the sensor element will be damaged by a tread-puncturing object exactly at the instant that a dangerous pressure loss is supposed to be indicated. Although a defective tire sensor element can be detected by the respective control unit after some time, it is not clear even then whether only the sensor element has failed or whether at the same time, there was a loss in pressure. However, it is often the case that a sudden loss in pressure will result in a sudden deflation of the tire (particularly at high driving speeds) with an extremely disadvantageous dynamic behavior of the vehicle and potentially fatal consequences.

Such an event is especially hazardous if the external body that has punctured the tire has destroyed the tire sensor element, but the tire does not show any notable loss in pressure at that time. If the driver were to check the tire pressure upon an inactive notification message of the sensor element, the driver would find almost no loss in pressure. The external body would then become loose and fall out when the driver resumed driving.

Not until then would there be a sudden pressure loss that the driver would not notice without an additional indication in the display.

To date it has been assumed that a puncture-induced pressure loss and the failure of the respective system monitoring the tire pressure are two separate independent events, the simultaneous occurrence of which is highly improbable. However, at variance with this assumption is the fact that the probability of a simultaneous occurrence can be calculated and is not at all insignificant. If one assumes that the plate-shaped sensor element has an area of 3 cm$^2$ and that the tread has, for example, an area of 2,298 cm$^2$, then the probability of the two aforesaid events occurring at the same time is 1:766. This probability can be halved to 1:1,532, if one assumes that only half of the penetrating objects are so long that they will "fatally" hit the sensor element. Given a million vehicles, an average kilometrage of 15,000 km and a flat tire probability of once every 100,000 km, the result is 150,000 flat tires per year. Of these 150,000 flat tires, divided by 1,532, equals 98 such flat tires, where a puncture and a "sensor death" will likely occur at the same time.

The proposed solutions according to the invention largely reduce these problems in a simple and simultaneously cost effective way. Hence, in the event of tire defects in vehicles equipped with a tire pressure monitoring system, a significant improvement in the driving safety would be achieved in a simple way by means of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
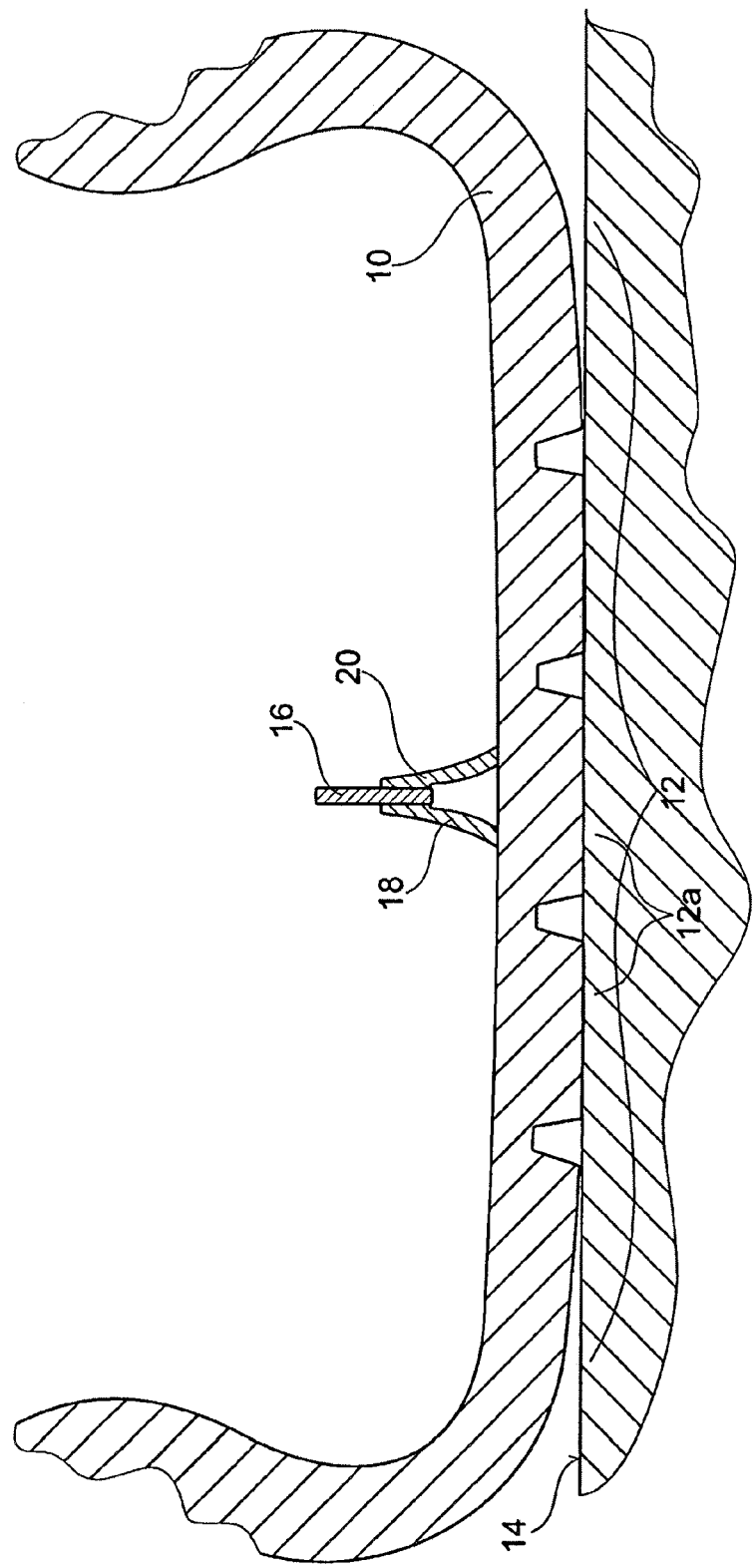
FIG. 1 is a partial cross-sectional view of a first exemplary embodiment of an inventive tire, in addition to the sensor element mounted there.

FIG. 1 shows a tire 10 with its tire carcass (shown in a cross sectional view) having sidewalls and a tread 12. When put into operation, the tire 10 rolls with this tread 12 on a driving surface 14. A sensor element 16 is mounted radially inwards on an inner surface of the tire tread 12 by way of two resilient brackets 18 and 20, which project radially inwards away from the tread 12. In this case the sensor element 16 is designed in the shape of a plate and is arranged in the radial direction or, more specifically, perpendicular to the adjacent tread area 12a. In this way the engagement face on the sensor element 16 is significantly reduced for an object, such as a nail, puncturing the tread 12, as compared to a parallel or, more specifically, axially oriented arrangement of the sensor element 16 on the tread 12. Furthermore, the sensor element 16 is mounted resiliently on the tread 12, so that in the event of an external influence caused by a penetrating object, the sensor element can still dodge this object under some circumstances.

Figure 2:
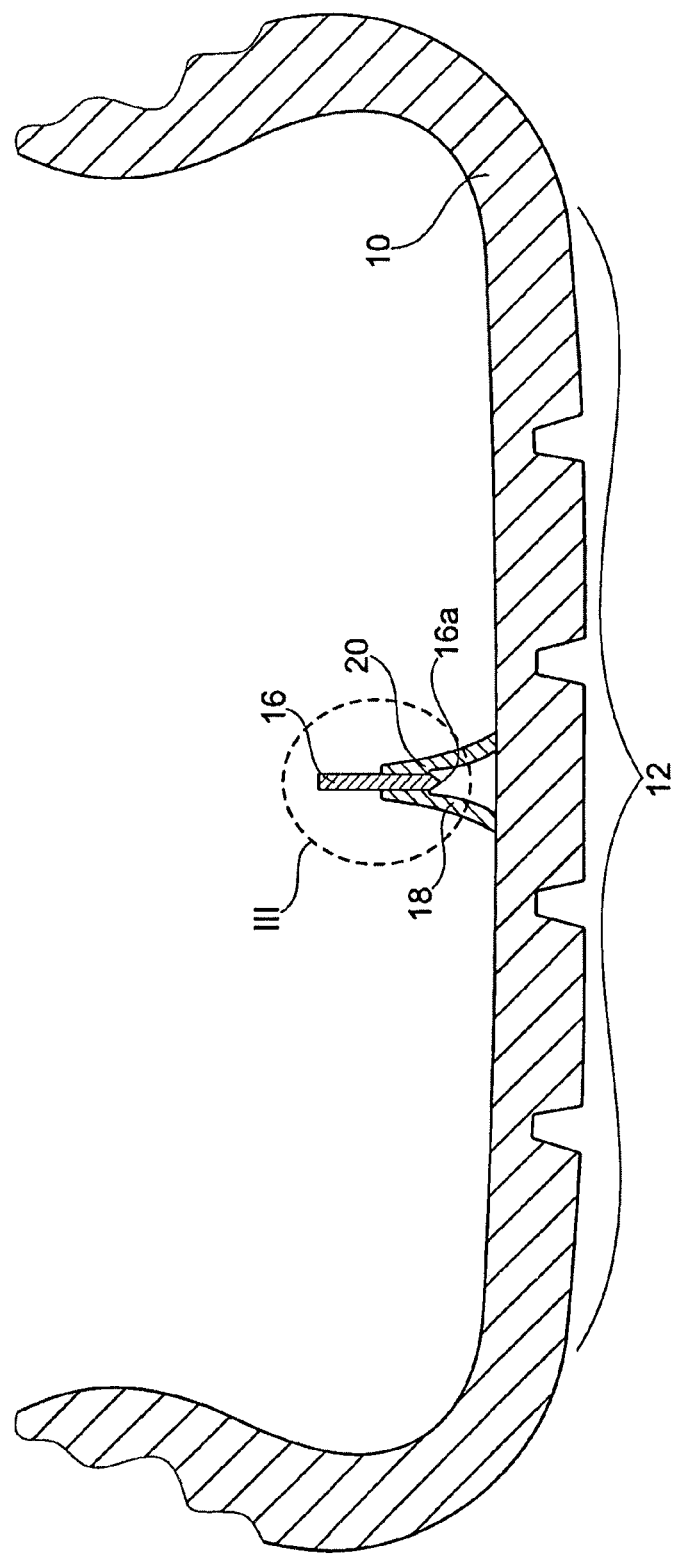
FIG. 2 is a partial cross-sectional view of a second exemplary embodiment of an inventive tire, in addition to the sensor element mounted there.
Figure 4:
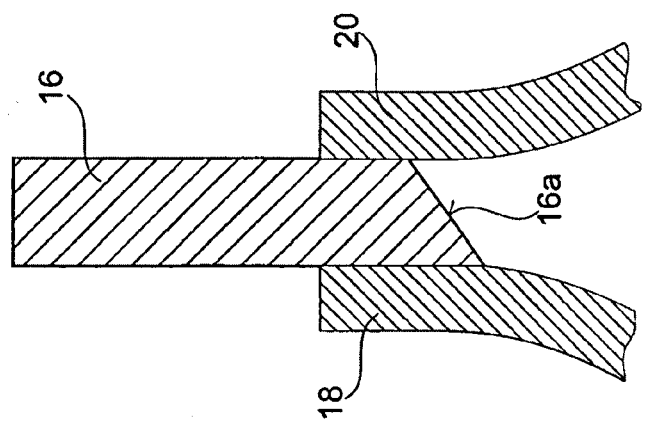
FIG. 4 shows a variant of the arrangement of the sensor element according to FIG. 3.
Figure 3:
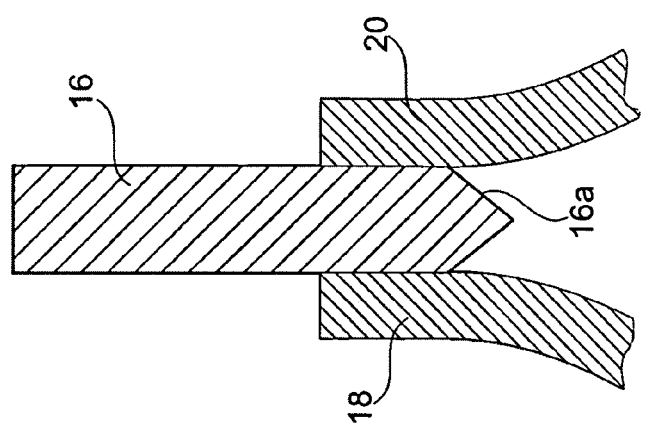
FIG. 3 shows the detail area III of the arrangement of the sensor element in FIG. 2.

FIG. 2 shows a design variant of a sensor element 16, shown radially inwards on a tread 12. In this case, the side of the sensor element 16 that faces radially outwards in the direction of the adjacent tread area 12a has an outer face 16a, which is obliquely sloped in relation to this tread area 12a. Penetrating objects slide off the oblique outer face 16a in such a way that they largely leave the sensor element 16 unharmed. FIGS. 3 and 4 show two variants of this type of sensor element 16. In the case of the variant from FIG. 3, the outer face 16a is designed so as to taper to a point in the direction of its center; whereas in the case of the variant according to FIG. 4 the slope of the outer face 16a extends from one edge all the way to the opposite edge.

Figure 5:
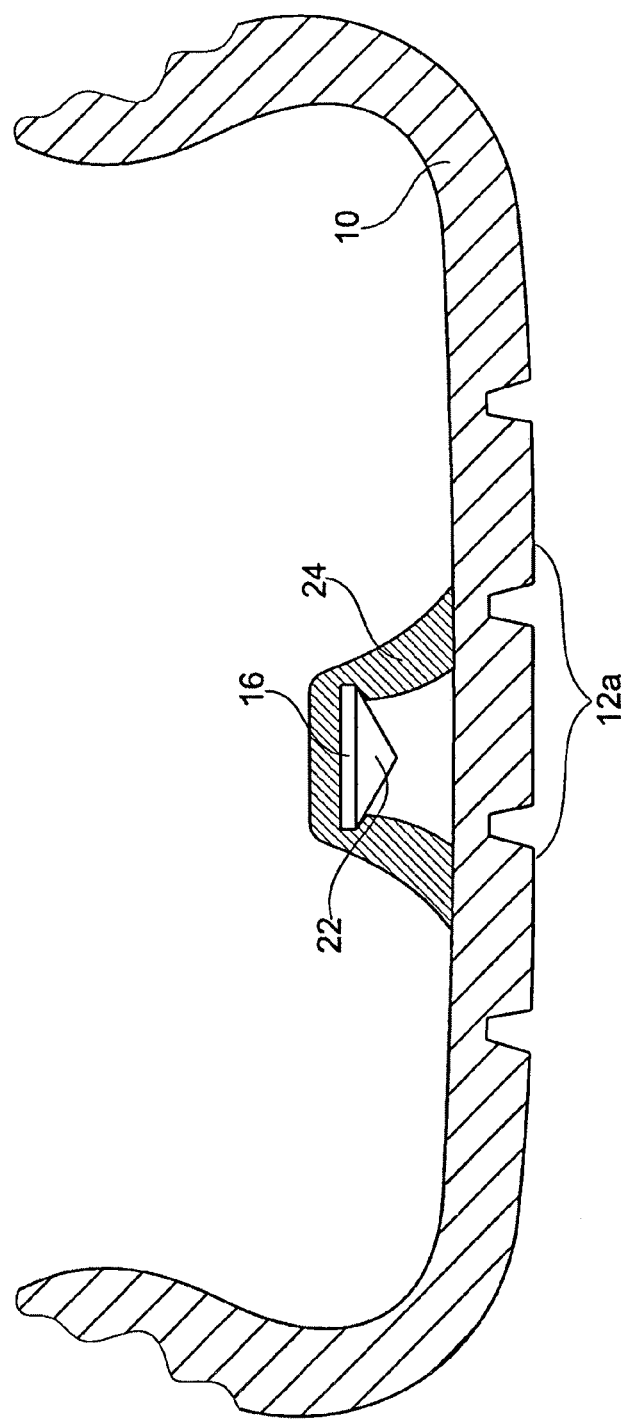
FIG. 5 is a partial cross-sectional view of a third exemplary embodiment of an inventive tire, in addition to the sensor element mounted there.

In the exemplary embodiment according to FIG. 5, the side of the sensor element 16 that faces the tread 12 has a deflecting cone 22, which is made additionally of a metal material and in this way serves as a deflector and as a protective layer for the electronic components (not shown in detail) that lie behind the protective layer. In this context the sensor element 16 is mounted (to the extent that this is absolutely necessary from a hardware viewpoint) in a cup 24 and is oriented essentially parallel to the adjacent tread area 12a.

Figure 6:
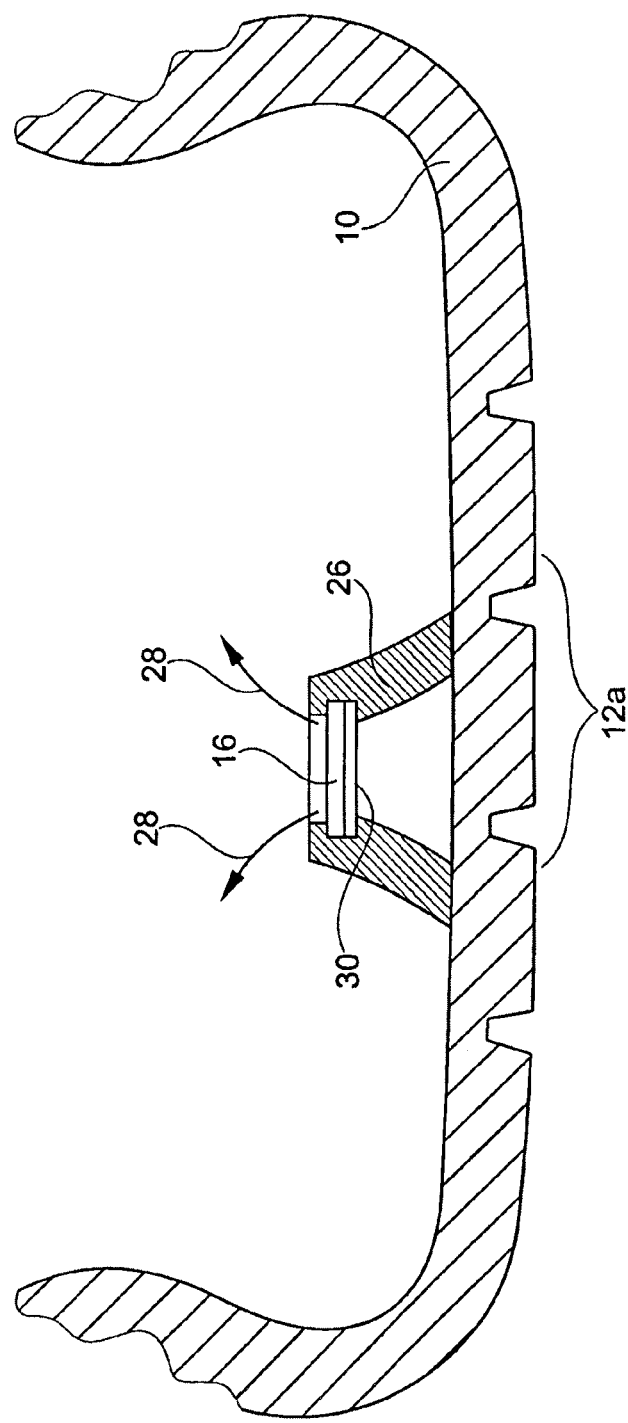
FIG. 6 is a partial cross-sectional view of a fourth exemplary embodiment of an inventive tire, in addition to the sensor element mounted there.

The exemplary embodiment according to FIG. 6 shows a sensor element 16, which is also mounted essentially parallel to the adjacent tread area 12a. In this case the mounting is formed by a ring 26, out of which the sensor element 16 can be unfolded or displaced in the direction of the arrows 28. The sensor element 16 has a protective layer 30 on the side facing the tread area 12a.

| Table of Reference Numerals | |
| --- | --- |
| 10 | tire |
| 12 | tread |
| 12a | tread area |
| 14 | driving surface |
| 16 | sensor element |
| 16a | outer face |
| 18 | bracket |
| 20 | bracket |
| 22 | deflection cone |
| 24 | cup |
| 26 | ring |
| 28 | arrow |
| 30 | protective layer |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle tire, comprising:
   sidewalls;
   a tread adjoining the sidewalls and being operatively configured for rolling on a driving surface;
   a plate-shaped sensor element having opposing major side surfaces exposed to an inner area of the vehicle tire, the plate-shaped sensor element being operatively mounted on an inner side of the tread with a substantially perpendicular orientation of the major side surfaces relative to an adjacent tread area of the tread in order to minimize exposure of the major side surfaces, when viewed from the direction substantially perpendicular to the ground contact surface of the tread, to external influences due to puncture.

2. The tire according to claim 1, wherein the plate-shaped sensor element is operatively mounted on the inner side of the tread to be deflectable under an external influence.

3. The tire according to claim 1, wherein a side of the plate-shaped sensor element facing the adjacent tread area has an outer face arranged obliquely relative to the inner side of the tread.

4. The tire according to claim 2, wherein a side of the plate-shaped sensor element facing the adjacent tread area has an outer face arranged obliquely relative to the inner side of the tread.

* * * * *